US008732575B2

(12) United States Patent  
Nusbaum (10) Patent No.: US 8,732,575 B2
(45) Date of Patent: May 20, 2014

(54) WORD PROCESSING SYSTEM AND METHOD WITH AUTOMATIC UNDO OPERATION MONITORING AND ANALYSIS

(75) Inventor: Mark E. Nusbaum, McLean, VA (US)

(73) Assignee: Mark E. Nusbaum, McClean, VA (US)

( * ) Notice: Subject to any disclaimer, the term of this patent is extended or adjusted under 35 U.S.C. 154(b) by 222 days.

(21) Appl. No.: 13/417,675

(22) Filed: Mar. 12, 2012

(65) Prior Publication Data

US 2012/0246563 A1 Sep. 27, 2012

Related U.S. Application Data

(60) Provisional application No. 61/457,415, filed on Mar. 22, 2011.

(51) Int. Cl.
G06F 17/24 (2006.01)
(52) U.S. Cl.
USPC ............ 715/255; 715/200; 715/226; 715/256
(58) Field of Classification Search
None
See application file for complete search history.

(56) References Cited

U.S. PATENT DOCUMENTS

| 4,797,855 | A | | 1/1989 | Duncan, IV et al. | |
|---|---|---|---|---|---|
| 5,694,610 | A | * | 12/1997 | Habib et al. | 715/210 |
| 5,778,402 | A | | 7/1998 | Gipson | |
| 6,527,812 | B1 | * | 3/2003 | Bradstreet | 715/210 |
| 7,207,034 | B2 | * | 4/2007 | Burke et al. | 717/110 |
| 7,454,700 | B1 | * | 11/2008 | Jones et al. | 715/255 |
| 7,499,955 | B2 | * | 3/2009 | Kao et al. | 1/1 |
| 7,818,718 | B2 | * | 10/2010 | Wedel et al. | 717/110 |
| 7,900,142 | B2 | * | 3/2011 | Baer | 715/255 |
| 8,095,575 | B1 | | 1/2012 | Sharma et al. | |
| 2004/0225998 | A1 | * | 11/2004 | Van De Vanter et al. | 717/113 |
| 2004/0268187 | A1 | * | 12/2004 | Burke et al. | 714/40 |
| 2005/0256829 | A1 | * | 11/2005 | Yang et al. | 707/1 |
| 2005/0256849 | A1 | * | 11/2005 | Krishnaswamy et al. | 707/3 |
| 2006/0271851 | A1 | * | 11/2006 | Racovolis et al. | 715/530 |
| 2008/0098045 | A1 | * | 4/2008 | Radhakrishnan et al. | 707/203 |
| 2008/0134161 | A1 | * | 6/2008 | Chamieh et al. | 717/166 |
| 2008/0168344 | A1 | * | 7/2008 | Deaguero et al. | 715/236 |

OTHER PUBLICATIONS

Khalek et al. "Efficiently Running Test Suites Using Abstract Undo Operations", IEEE Computer Society, 2011, pp. 110-119.*

* cited by examiner

*Primary Examiner* — Maikhanh Nguyen
(74) *Attorney, Agent, or Firm* — Nixon & Vanderhye, P.C.

(57) ABSTRACT

A word processing system includes an undo function monitor that monitors the history of a user's use of the undo operation. Depending upon the pattern detected, the system disables the particular auto-formatting feature that triggered the undesired automatic operation. In an illustrative embodiment, the system tracks whether a number of undo operations exceeds a programmable threshold. In one illustrative implementation, the system also tracks the number of times a user has undone, i.e., reversed, an automatic formatting operation compared with the number of instances where the user has permitted the subject automatic formatting operation to take place.

18 Claims, 9 Drawing Sheets

FIGURE 1

Q. Does the bank statement have a transmittal letter that refers to the deposit you claim you made?

A.  No, it doesn't.

FIGURE 2A

Q.   Does the bank statement have a transmittal letter that refers to the deposit you claim you made?

A.  No, it doesn't.

Q. Does the bank statement have a transmittal letter that refers to the deposit you claim you made?

A. No, it doesn't.

FIGURE 2C

Q. Does the bank statement have a transmittal letter that refers to the deposit you claim you made?
R.

A. No, it doesn't.

FIGURE 2D

II. DECLARATION

1. When in the Course of human events, it becomes necessary for one people to dissolve the political bands which have connected them with another, and to assume among the powers of the earth, the separate and equal station to which the Laws of Nature and of Nature's God entitle them, a decent respect to the opinions of mankind requires that they should declare the causes which impel them to the separation.

2. We hold these truths to be self-evident, that all men are created equal, that they are endowed by their Creator with certain unalienable Rights, that among these are Life, Liberty and the pursuit of Happiness.

3. That to secure these rights, Governments are instituted among Men, deriving their just powers from the consent of the governed,

FIGURE 2E

II. DECLARATION

When in the Course of human events, it becomes necessary for one people to dissolve the political bands which have connected them with another, and to assume among the powers of the earth, the separate and equal station to which the Laws of Nature and of Nature's God entitle them, a decent respect to the opinions of mankind requires that they should declare the causes which impel them to the separation.

1. We hold these truths to be self-evident, that all men are created equal, that they are endowed by their Creator with certain unalienable Rights, that among these are Life, Liberty and the pursuit of Happiness.

2. That to secure these rights, Governments are instituted among Men, deriving their just powers from the consent of the governed,

FIGURE 2F

1. When in the Course of human events, it becomes necessary for one people to dissolve the political bands which have connected them with another, and to assume among the powers of the earth, the separate and equal station to which the Laws of Nature and of Nature's God entitle them, a decent respect to the opinions of mankind requires that they should declare the causes which impel them to the separation.
2. We hold these truths to be self-evident, that all men are created equal, that they are endowed by their Creator with certain unalienable Rights, that among these are Life, Liberty and the pursuit of Happiness.
3. That to secure these rights, Governments are instituted among Men, deriving their just powers from the consent of the governed,

FIGURE 2G

1. When in the Course of human events, it becomes necessary for one people to dissolve the political bands which have connected them with another, and to assume among the powers of the earth, the separate and equal station to which the Laws of Nature and of Nature's God entitle them, a decent respect to the opinions of mankind requires that they should declare the causes which impel them to the separation.

a. We hold these truths to be self-evident, that all men are created equal, that they are endowed by their Creator with certain unalienable Rights, that among these are Life, Liberty and the pursuit of Happiness.

2. That to secure these rights, Governments are instituted among Men, deriving their just powers from the consent of the governed,

WORD PROCESSING SYSTEM AND METHOD WITH AUTOMATIC UNDO OPERATION MONITORING AND ANALYSIS

CROSS-REFERENCE TO RELATED APPLICATION

This application claims the benefit under 35 U.S.C. 119(e) of Provisional Application No. 61/457,415 filed on Mar. 22, 2011, entitled "Word Processing System And Method With Automatic Formatting Operation Monitoring And Analysis," the entire contents of which is hereby incorporated by reference in this application.

FIELD

This invention generally relates to word processing systems and methodologies. More particularly, illustrative implementations relate to document analysis software for preventing a word processing system from applying automatic formatting settings associated with a document when monitoring software determines based upon user operations that it is unlikely that a user desires to initiate such automatic formatting in the document being edited.

BACKGROUND AND SUMMARY

Over at least the past decade, with the drastic drop in price and miniaturization of laptop and notebook computers, vast numbers of individuals have been actively engaged in generating and manipulating their own documents. Although word processing skills vary widely between users, many students and professionals generating/editing documents lack the word processing skill level to take full advantage of the capabilities of the word processing system that they are utilizing.

In an office setting, where a wide range of users, such as journalists, lawyers, agents, and consultants are generating and editing draft documents, old documents are oftentimes utilized as a starting point for drafting new documents. Such old documents are selected for use for a variety of reasons. Many times such documents are selected merely because they contain, for example, common project or address information.

Such old documents that are used as a starting point for creating a new document often include embedded automatic formatting codes, that may have been advantageous in the prior/original document, but which generate unexpected problems in creating and editing the new document. For example, if a document has been set up with a format oriented towards creating an alphabetized outline, when a user strikes an enter key intending to advance to the left hand margin, the system may generate the next letter in the alphabet when no such generation is desired. In other instances, bullets may be generated automatically when not intended by the user. Further, unwanted single spacing, paragraphing, or margin generation may be generated.

Such undesired actions can be extremely frustrating to the typical user. The typical user may have little success in deleting the unwanted formatting codes on either a local paragraph, page, or document-wide basis. Such users are often not familiar enough with their word processing system to appreciate how automatic formatting features are appropriately disabled. Such users are then faced with the frustrating exercise of time and time again, either deleting operations that have occurred and retyping text appropriately, or using an "undo" function or "undo" edit key to initiate a reversal of the automatic formatting operation. An "undo" function or an "undo" edit key is a familiar and conventional feature of many document processing computer applications. For example, spreadsheets and word processors typically allow data entry, such as adding new data, deleting existing data, cut and paste operations, and data formatting to be undone.

Often, a user will repetitively hit the "undo" edit key to reverse the impact of the automatic formatting. In many instances, a user will continue utilizing the undo function until the editing process is complete.

In accordance with an illustrative implementation, a word processing system includes an undo function monitor that monitors the history of a user's use of the undo operation. Depending upon the pattern detected, the system may disable the particular auto-formatting feature that triggered the undesired automatic operation.

In an illustrative embodiment, the system tracks whether a number of undo operations exceeds a programmable threshold. In one illustrative implementation the system also tracks the number of times a user has undone, i.e., reversed, an automatic formatting operation compared with the number of instances where the user has permitted the subject automatic formatting operation to take place. In other implementations, the number of undo operations are tracked on a paragraph, page, and document section basis so that automatic formatting disabling options may be provided taking into account the document context within which such undo operations occurred.

These and other features of the illustrative implementations will become apparent from a review of the drawings of which:

DETAILED DESCRIPTION OF THE INVENTION

Figure 1:
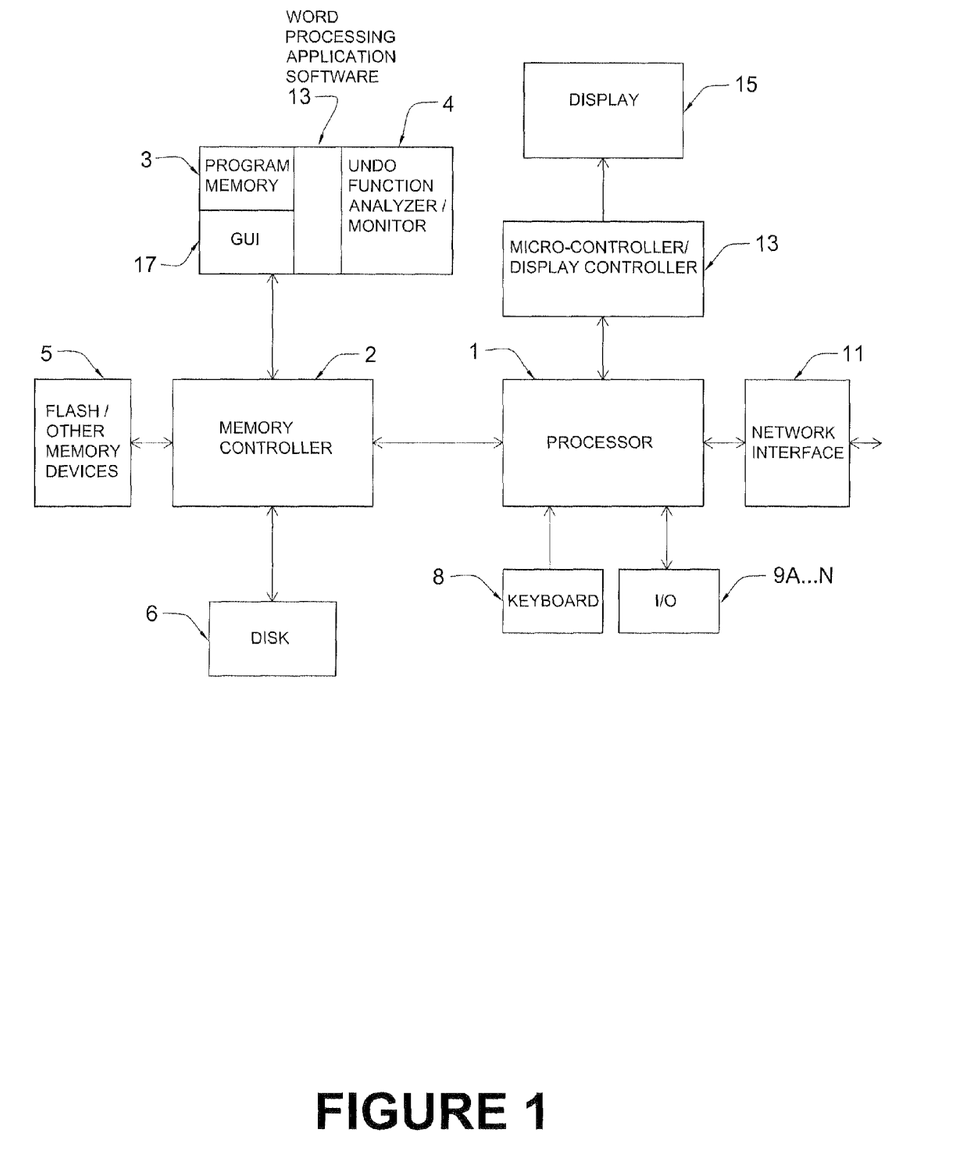
FIG. 1 is block diagram of an illustrative word processing system incorporating the automatic document analysis and embedded code removal system of the illustrative implementations.

FIG. 1 is a block diagram of a computer system including a word processing system having an associated undo function monitor/analyzer 4 in accordance with an illustrative implementation. The illustrative implementations may be practiced on a wide range of data processing systems and the system shown in FIG. 1 is for illustrative purposes only.

As shown in FIG. 1, an illustrative computer system includes processor 1 that may, for example, be an Intel Core i7-950 Quad-Core processor. Coupled to processor 1 is a microcontroller 13 that serves as a display controller for display 15, which may, for example, be an LCD/touchscreen monitor. The system includes a wide array of input devices (represented as I/O devices 9A-N) that are operatively coupled to processor 1 including a keyboard 8, and various other input/output devices such as input pointing devices that may include a pointing stick, a mouse, a track ball, a pen, a touchscreen, or any other device that permits a user to manipulate objects, icons, and other display items in a graphical manner on a display 15. The I/O devices 9 A-N may also include a microphone input and speakers.

The illustrative computer system includes a memory controller 2 coupled to processor 1. Memory controller 2 in this example controls a wide variety of memories including program memory 3 that stores graphical user interface (GUI) software 17, word processing application software 13 that includes, or has access to, undo function analyzer/monitor 4.

Additionally, memory controller 2 operates as a disk controller to control disk storage 6. In other implementations, a separate disk controller may be utilized. Memory controller 2 is coupled to a variety of other memory devices 5. Memory devices 5 represent a wide range of memory devices that may be utilized as program and/or data storage including flash memory, and additional memory devices (represented for illustration purposes only as one device 5) that may include, for example, DDR 2/DDR3/DDR4, SDRAM, and removable memories including SD/MMC/SM/xD memory cards. A portion of the above-identified memory space is set aside for information page cache (not shown). Additionally, file space on disk storage 6 may be set aside as an additional document page cache.

In accordance with non-limiting, illustrative embodiments, the undo function analyzer/monitor 4 described herein may be integrated into an existing word processing system or sold separately together with appropriate software for interfacing with conventional word processing software. As appreciated by those skilled in the art, conventional word processing systems are highly sophisticated, performing a wide range of text manipulation functionality such as auto-correction of text and text formats, automated spelling correction, undo-redo operations and event-based auto-formatting, to name a few. The details of such word processing functionality are well known to those skilled in the art and are described in detail in, for example, U.S. patents to Rayson et al. (U.S. Pat. No. 5,761,689), Duncan, IV et al. (U.S. Pat. No. 4,797,855), Burke et al. (U.S. Pat. No. 7,207,034) and Gibson (U.S. Pat. Nos. 5,778,402 and 5,900,004), each of which is incorporated herein by reference.

The computer system shown in FIG. 1 includes GUI software 17 to permit graphic manipulations by a user with the various input devices 8 and 9A-N. The GUI in concert with the word processing application software 13 permit the display, editing of documents, and the performance of a wide array of document formatting and other operations in a manner known to those skilled in the art. The document may include graphical, audio, or text information including information pages presented to the user on display 15 in conjunction with speakers or other output devices included in I/O devices 9 A-N. The information pages may contain user selectable links (such as hypertext links used on the World Wide Web) using Network Interface 11 to other information pages, where such links can be activated by one of the input devices 9A-N to request the associated information pages. The network interfaced by Network Interface 11 may be any known local area network (LAN) or wide area network (WAN), e.g., the Internet.

In non-limiting illustrative embodiments described herein, a computer-implemented word processing system includes an undo function monitor/analyzer (4) that tracks user initiated "undo" operations and determines whether the number of such undo operations exceeds, for example, a predetermined programmable threshold for a given document or document segment. In one illustrative implementation, the system also tracks the number of times a user has undone, i.e., reversed, an automatic formatting operation compared with the number of instances where the user has permitted the subject automatic formatting operation to take place.

Figure 2A:
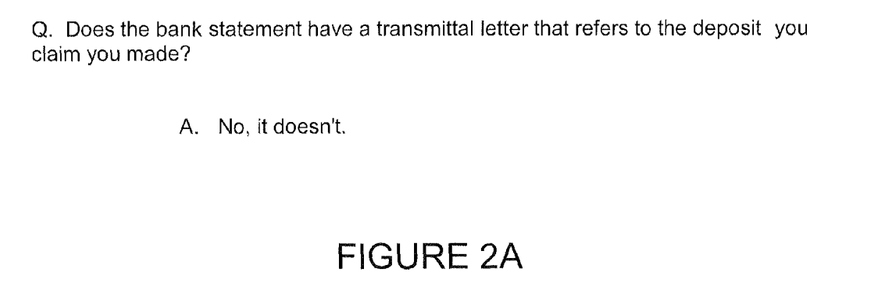
FIG. 2A is an example of a segment of a word processing document operated on by a user.
Figure 2B:
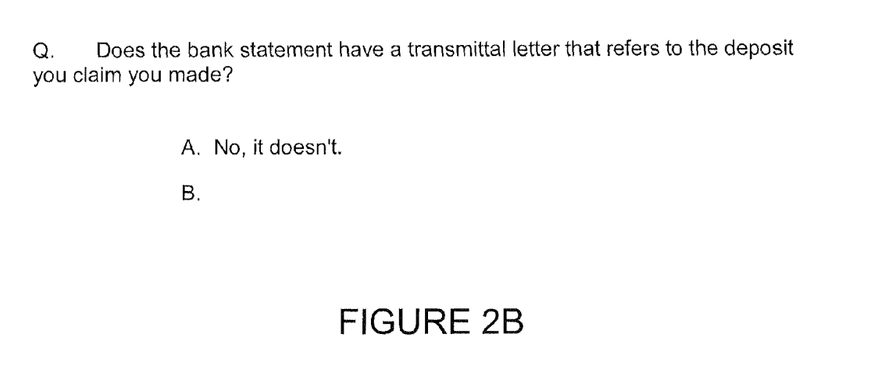
FIG. 2B is an example of an undesired automatic formatting operation.

FIGS. 2A and 2B illustrate a user's view of a portion of a word processing document of a type including unwanted embedded automatic formatting codes. In this example, the author intends to generate, for example, a text document of a proposed cross-examination of a trial witness in which it is desired to have a "question and answer" layout style/format, wherein a first paragraph is a "question" and a following second or "answer" paragraph is presented indented below it, as represented in FIG. 2A by the pair of paragraphs respectively having leading "Q." and "A." indicia. Assuming the document has been copied from a source document that, unknown to the user, has been originally formatted to provide for automatic numbering/alphabetizing of successive paragraphs (an auto-formatting option commonly available in many word processing systems), undesirable character insertions/deletions, as illustrated by FIG. 2B, will be produced by at least one commonly used word processing system. This is typically due to the existence of certain formatting codes which were embedded within the original document by the word processor used to create the document. In this example, referring again to FIG. 2A, if a user strikes the "enter" (or "return") key after typing the text "doesn't.", a conventional word processing system will automatically generate and insert undesired sequential alphabetic or numeric indicia characters due to document-embedded automatic formatting codes. Thus, for example, instead of returning to the left hand margin, as might be expected by the user, for the typing of another "Q," the system may automatically generates a "B" under the "A" due to an embedded automatic formatting code.

Figure 2C:
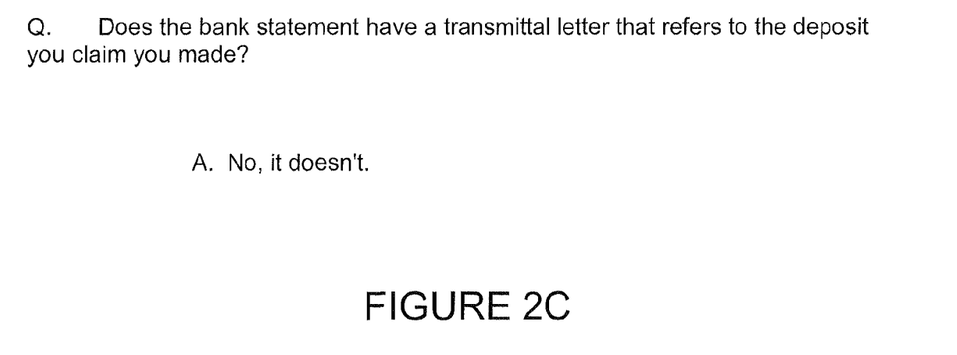
FIGS. 2C and 2D are a further example of a document to be operated on and an undesired automatic formatting operation.
Figure 2D:
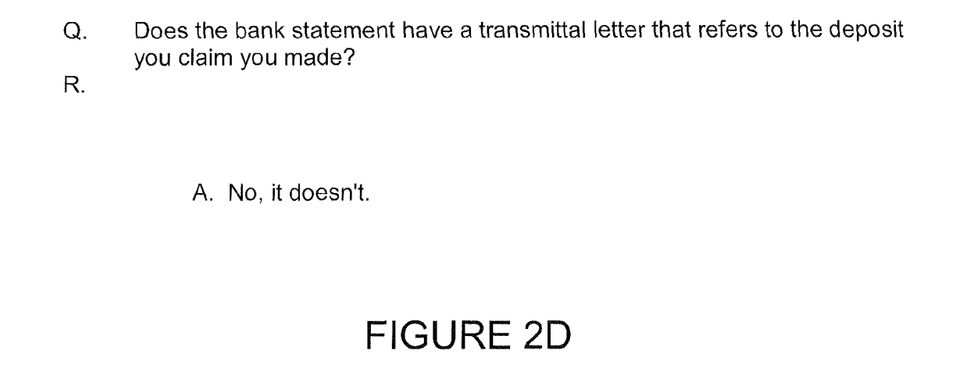
Figure 2E:
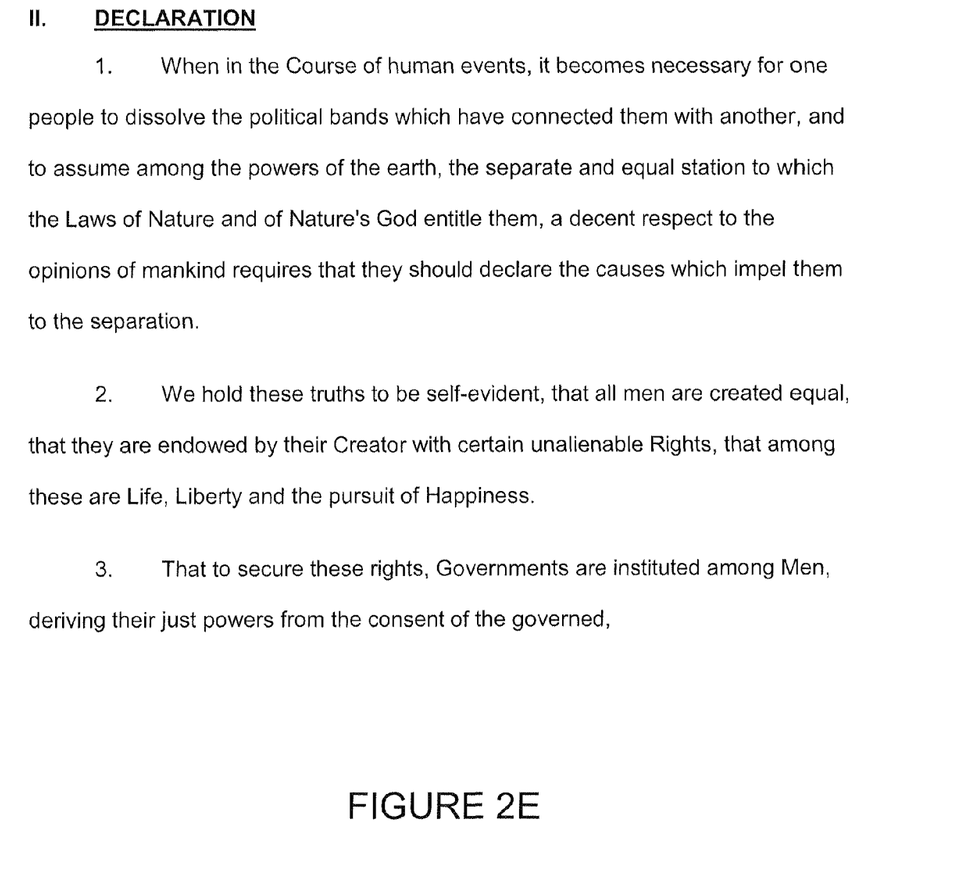
FIGS. 2E and 2F are a further example of a document to be operated on and an undesired automatic formatting operation.
Figure 2F:
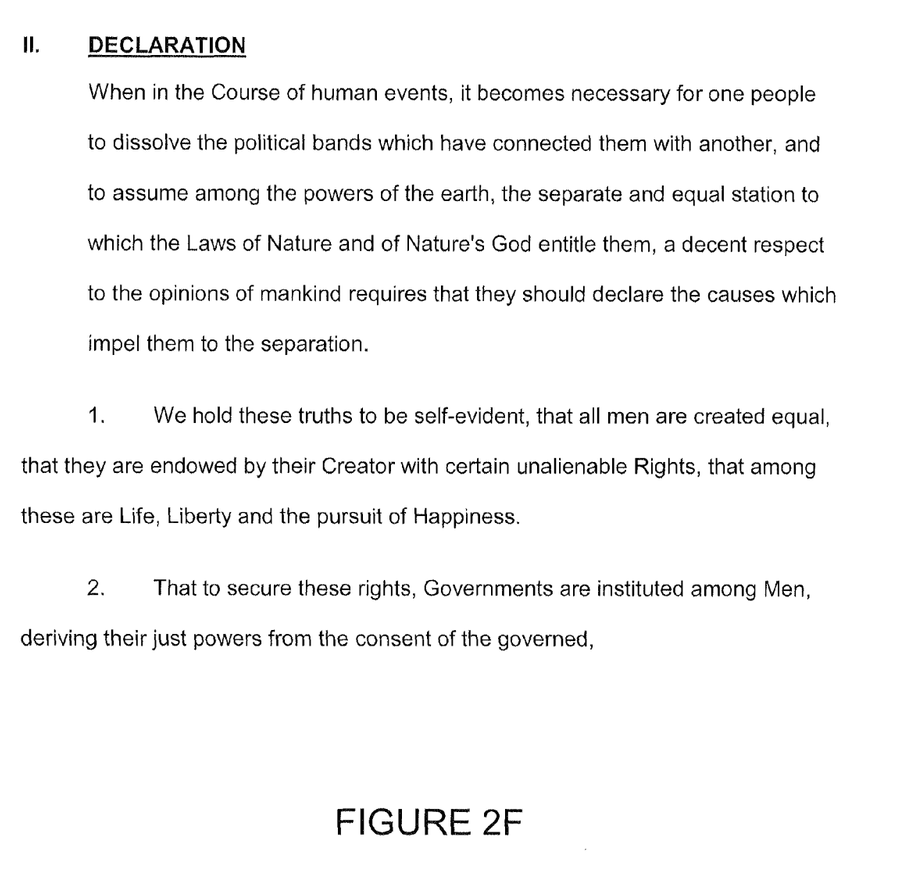
Figure 2G:
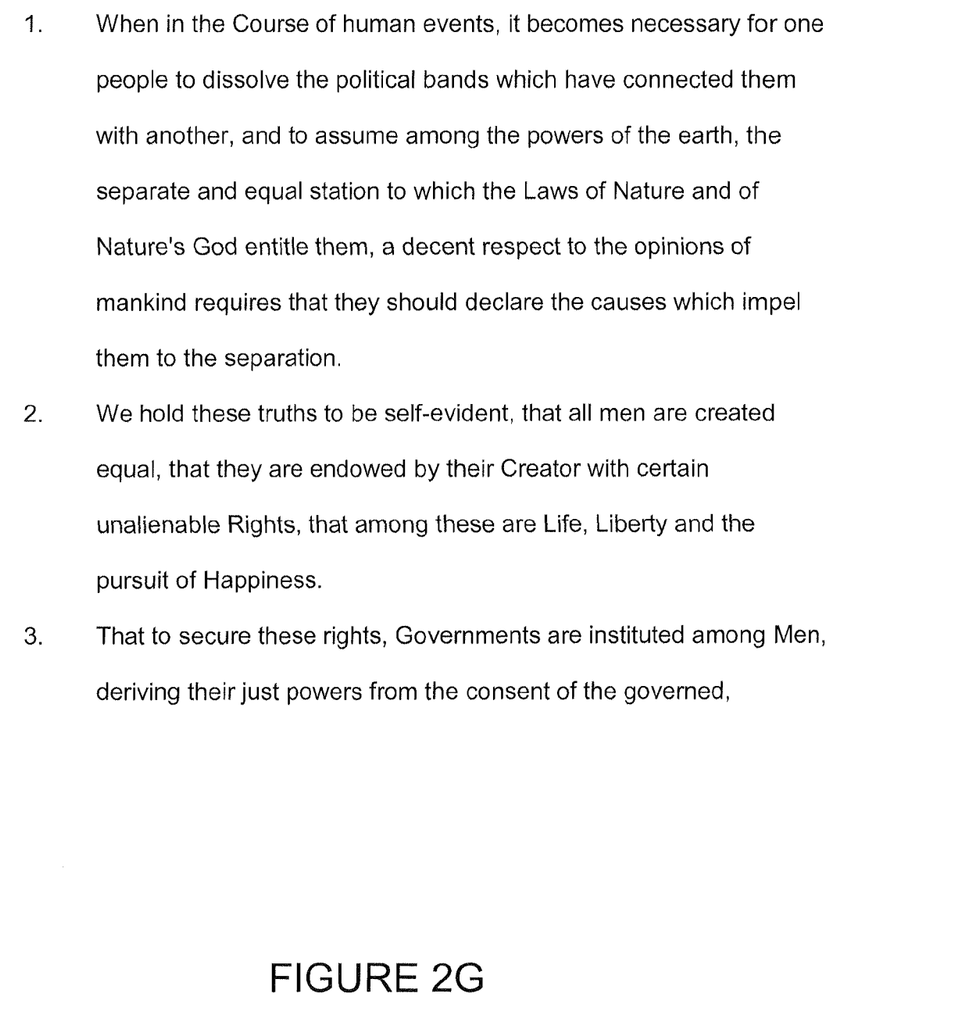
FIGS. 2G and 2H are a further example of a document to be operated on and an undesired automatic formatting operation.
Figure 2H:
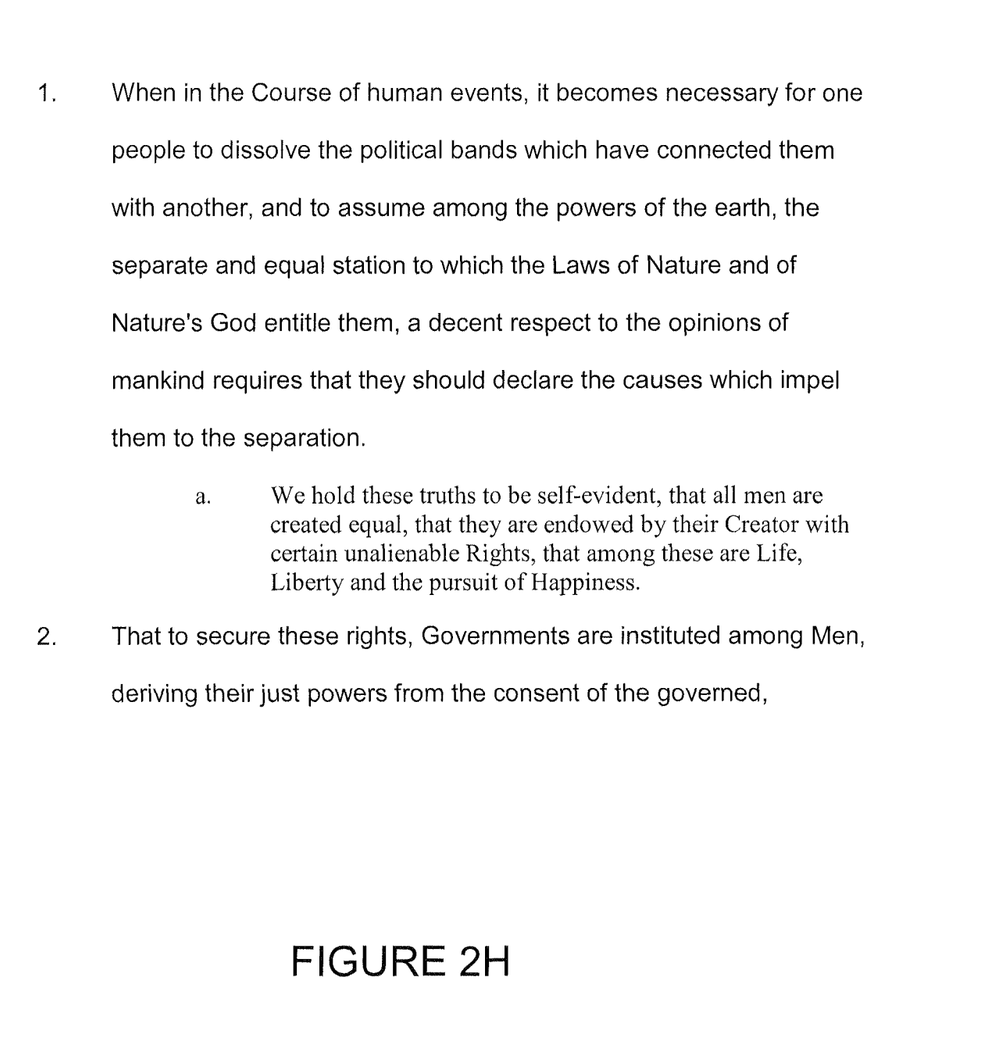

Similarly, as shown in FIGS. 2C and 2D, if the user hits the "enter" key after "Q.," in this example, an "R" will automatically be generated under "Q." The user may then either delete the B or the R shown in FIG. 2B or 2D or, alternatively, initiate an "undo" operation. In many instances, the user, whether away on a business trip or lacking word processing resources, will repeatedly initiate such "undo" operations to repeatedly eliminate the undesired operations, and waste a great deal of time and effort.

As further examples, FIGS. 2E, 2F, 2G and 2H show a document excerpt with a numbered paragraph-related automatic format. An attempt by the user to delete "1" or "2" triggered undesired automatic formats having, for example, undesired left margin or single spacing consequences. Once again, in many instances with such types of documents, a user will attempt to remedy the problem by repeatedly initiating "undo" operations to correct the formatting problems, and waste a great deal of time and effort.

Figure 3:
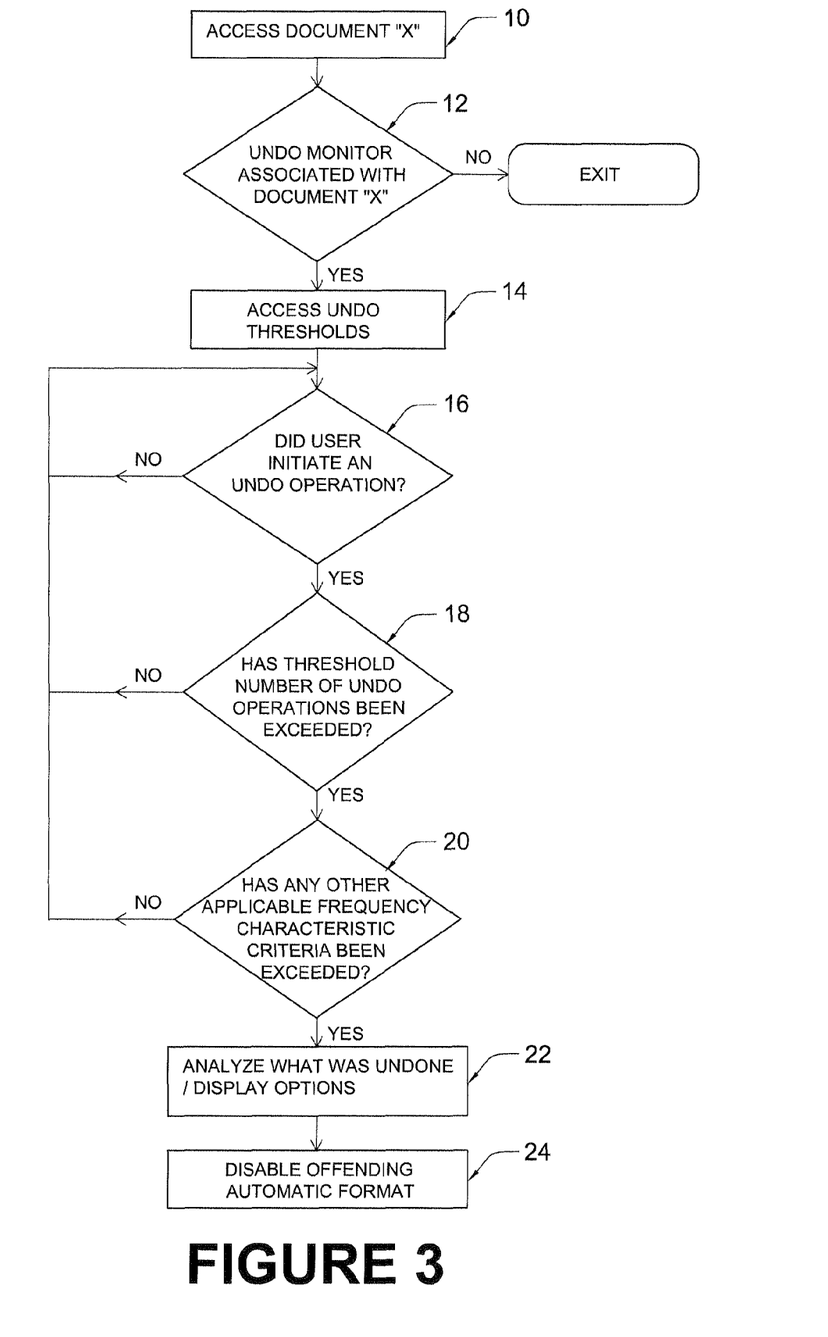
FIG. 3 is a flowchart delineating the sequence of operations of an illustrative implementation.

FIG. 3 is a flowchart delineating a sequence of operations for a non-limiting illustrative example implementation that automatically modifies documents such as shown in FIGS. 2A-2H to eliminate the associated automatic formatting.

As illustrated at block 10 of the of FIG. 3, a document "X", containing a formatted portion such as is illustrated in FIG. 2A, is first accessed by the system. A check is then made at block 12 to determine if the document X was previously associated with the "undo" function monitor 4 (FIG. 1), e.g., when the document was first created or during any later access. If not previously so associated, the "undo" function routine is exited.

However, if the "undo" function monitor has been associated with document X, the system will access the "undo" thresholds/criteria associated with document X, as indicated at block 14.

Next, as indicated at decision block 16, a check is then made to determine whether the user initiated an "undo" operation. If the user did not, the undo function routine continues to periodically check whether an undo operation has been initiated at block 16.

If the user initiated an "undo" operation, a check is then made to determine whether the number of "undo" attempts has exceeded either a user-selectable or a predefined threshold of "undo" operations, as indicated at block 18. If the applicable threshold of "undo" operations is not exceeded, the routine returns to checking whether the user initiated an "undo" operation at block 16. In an illustrative embodiment, if the threshold is exceeded, the routine may then directly analyze what was undone and display options to the user, as indicated at block 22. However, in accordance with alternative illustrative embodiments, if enabled/initiated by the system or the user, a further check is made (whether or not the initially identified threshold has been exceeded) to determine whether certain other initiated/user-predetermined occurrence frequency characteristic criteria are met or exceeded, as indicated by decision block 20. If no other undo operation criteria has been initiated/enabled for analysis, the routine proceeds to block 22 to analyze what was undone and to display options to the user.

More specifically, in accordance with certain illustrative embodiments, the system may be set up to monitor the number of "undo" operations executed by the user within a particular document segment (e.g., one or more paragraphs, pages, etc.). A check is then made in block 20 to determine whether a threshold for the frequency of undo operations per the applicable document segment has been exceeded. In yet other alternative embodiments, the system may also monitor within the same document the number of instances for which the user allows an automatic formatting operation performed by the word processor to remain in force (i.e., the number of word processor initiated automatic formatting operations that were permitted or left unchanged by the user not initiating an "undo" operation). In this example, if the number of user initiated "undo" operations exceeds the number of user-allowed executions by the word processor of its automatic formatting function by a predetermined threshold, then an analysis of the document is initiated (20).

Based upon an analysis of what was undone (22), the system may, in certain embodiments, automatically disable the offending automatic formatting (24). In yet other embodiments, in accordance with an analysis of what was undone as indicated at block 22, the system will disable the offending automatic format in accordance with a user selected set of disabling options.

Figure 4:
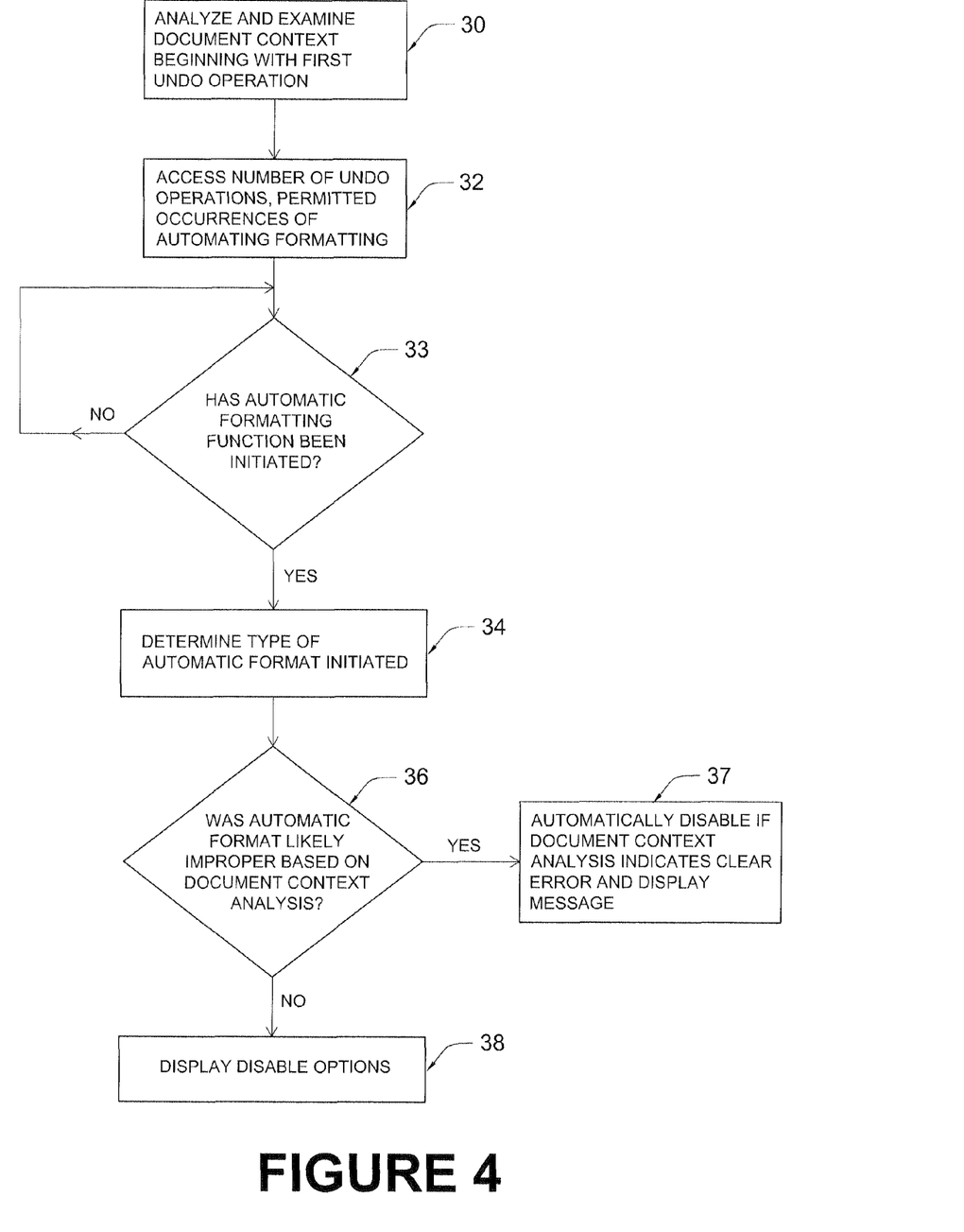
FIG. 4 is a more detailed flowchart of an illustrative undo operation analysis.

FIG. 4 shows exemplary undo analysis processing that may be performed in at least block 22 of FIG. 3 in further detail. The undo function analyzer, examines and analyzes the document context beginning with the first undo operation (30). The analysis may include, for example, determining the number of undo operations per paragraph or page of the document. The analysis may result, for example, in the recognition that the document context is a question (Q) and answer (A) format. Such an analysis may be used to determine, for example, that automatically inserting an R to begin a paragraph after a paragraph beginning with "Q" is improper.

Thereafter, the system accesses data collected during the undo use monitoring to, for example, access the number of undo operations performed in the document of automatic formatting functions and the frequency of the undo operations of an automatic formatting function when compared with the number of permitted occurrences by the user of any automatic formatting function (32).

The system then checks to determine whether an automatic formatting function has been initiated (33). If not the routine waits until such an automatic formatting function has been triggered. If an automatic operation has been initiated, the type of automatic format function initiated is determined (34).

The routine next determines whether the automatic format was likely improper based upon the analysis in block 30 of the document context (36). The system will then, in an illustrative implementation, automatically disable the automatic formatting if it is determined that there is a clear need to eliminate the automatic formatting that has been triggered and alert the user of the disabling, as indicated at block 37.

Thereafter, if the check indicated at block 36 fails to conclusively indicate that a clear error was made in triggering the automatic formatting, options for disabling the automatic formatting are displayed to the user, as indicated at block 38.

In accordance with alternative implementations, an analysis of what was undone or an analysis of deleted/edited text may be used to, for example, make similar deletions/edits in parts of the document yet to be edited, i.e., correcting similar errors throughout the document such as would occur when a user does a find and "replace all" operation. For example, once a user edits a recognized last name, e.g., changing "Rhodes" to Rhoads, such a change would be triggered, upon the first instance of changing "Rhodes" to Rhoads, automatically throughout the document automatically, without requiring a find and replace operation. Thus, a user's editing operations may be monitored, stored and analyzed to detect patterns that may be used to automatically edit parts of the document that have not as yet been edited by the user. In accordance with operation in this mode, it is contemplated that such edits would be displayed to the user for approval or to place the document back in the form prior to such automatic edits.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of operating a computer system having a memory system storing word processing software and a processing system for executing said word processing software to control automatic document formatting operations of various types and user-initiated undo operations, said method comprising:
    monitoring by said processing system whether a user initiated an undo operation while editing a document;
    determining by said processing system whether said undo operation eliminated a document change caused by an automatic formatting operation of a particular type;
    monitoring by said processing system information related to undo operation usage with respect to said document including the number of undo operations initiated by said user to undo said particular type of automatic formatting operation;
    storing in said memory system information indicative of a threshold number of permissible automatic formatting-related undo operations;

accessing by said processing system from said memory system said threshold number of permissible automatic formatting-related undo operations;

determining by said processing system whether a user initiated undo operation resulted in undo operation use exceeding said threshold number; and disabling said automatic formatting operation of said particular type by said processing system if said threshold number has been exceeded.

2. The method of operating a word processing system according to claim 1, wherein the step of disabling includes the step of automatically disabling generating an automatic format of the type that generates a line beginning with the next letter in the alphabet with respect to the beginning of a prior line.

3. The method of operating a computer system according to claim 1, wherein the step of disabling includes the step of automatically disabling generating an automatic format of the type that generates an outline-related automatic format.

4. The method of operating a computer system according to claim 1, wherein the step of disabling includes the step of automatically disabling an automatic format of the type that generates an automatic paragraph numbering format.

5. The method of operating a computer system according to claim 1, wherein the step of disabling includes the step of automatically disabling an automatic format of the type that generates a line spacing automatic format.

6. The method of operating a computer system according to claim 1, wherein the step of disabling includes the step of automatically disabling an automatic format of the type that generates a margin-related automatic format.

7. A method of operating a computer system according to claim 1, further including the step of displaying a set of disabling options from which the user may choose to implement.

8. A method of operating a computer system having a memory system storing word processing software and a processing system for executing said word processing software to control automatic document formatting operations of various types and user-initiated undo operations, said method comprising:

monitoring by said processing system whether a user initiated an undo operation while editing a document;

detecting by said processing system whether said undo operation eliminated a document change caused by an automatic formatting operation of a particular type;

monitoring by said processing system information related to undo operation usage with respect to said document including the number of undo operations initiated by said user to undo said automatic formatting operation of a particular type;

determining by said processing system whether the automatic formatting operation was improperly initiated based upon said information related to undo operation usage including the number of undo operations initiated by said user to undo said automatic formatting operation of a particular type, wherein said determining step includes determining whether a user initiated undo operation resulted in undo operation use exceeding a stored permissible usage threshold; and automatically disabling said automatic formatting operation of said particular type by said processing system if the determining step indicates improper initiation of the automatic formatting operation.

9. The method of operating a computer system according to claim 8, wherein the step of automatically disabling includes the step of automatically disabling an automatic format of the type that generates an automatic format that generates a line beginning with the next letter in the alphabet with respect to the beginning of a prior line.

10. The method of operating a computer system according to claim 8, wherein the step of disabling includes the step of automatically disabling an automatic format of the type that generates an outline-related automatic format.

11. The method of operating a computer system according to claim 8, wherein the step of disabling includes the step of automatically disabling generating an automatic format of the type that generates an automatic paragraph numbering format.

12. The method of operating a computer system according to claim 8, wherein the step of disabling includes the step of automatically disabling an automatic format of the type that generates a line spacing automatic format.

13. The method of operating a computer system according to claim 8, wherein the step of disabling includes the step of automatically disabling an automatic format of the type that generates a margin-related automatic format.

14. A computer system enabling a user to edit documents comprising:

a processing system for executing at least word processing software to control automatic document formatting operations of various types and user-initiated undo operations;

a memory system, coupled to said processing system, for storing documents and for storing said word processing software, said word processing software enabling various types of automatic formatting operations and enabling a user to initiate an undo operation; and an input device for editing documents, said input device enabling a user to initiate an undo operation;

wherein said memory system stores an undo function analyzer including instructions for causing said processing system to:

monitor whether a user initiated an undo operation while editing a document;

determine whether said undo operation eliminated a document change caused by an automatic formatting operation of a particular type;

monitor information related to undo operation usage with respect to said document including the number of undo operations initiated by said user to undo an automatic formatting operation of said particular type;

store information in said memory system indicative of a threshold number of permissible automatic formatting-related undo operations;

determine whether a user initiated undo operation resulted in an undo operation exceeding said threshold number of permissible automatic formatting-related undo operations; and disable said automatic formatting operation of a particular type if it is determined that said threshold number has been exceeded.

15. The computer system according to claim 14, further including a display, wherein the processing system is operable to display a set of disabling options from which the user may choose an option to implement.

16. The computer system according to claim 14, wherein the disable operation results in the processing system disabling automatic-generation of outline-related type of automatic formatting operations.

17. The computer system according to claim 14, wherein the disable operation results in the processing system disabling automatic generation of automatic paragraph numbering type of automatic formatting operations.

18. The computer system according to claim 14, wherein the disable operation results in the processing system disabling automatic generation of an automatic line spacing type of automatic format operations.

\* \* \* \* \*